United States Patent [19]
Hirose et al.

[11] 3,884,984
[45] May 20, 1975

[54] PROCESS FOR OXIDIZING OLEFINS

[75] Inventors: Isao Hirose; Kazutoshi Funabashi; Takeshi Fujii, all of Iwakuni; Kiyoshi Kawajiri, Hiroshima-ken, all of Japan

[73] Assignee: Teijin Ltd., Osaka, Japan

[22] Filed: May 16, 1973

[21] Appl. No.: 360,684

Related U.S. Application Data

[63] Continuation of Ser. No. 56,871, July 21, 1970, abandoned, which is a continuation-in-part of Ser. No. 615,432, Feb. 13, 1967, abandoned.

[52] U.S. Cl. ............. 260/634; 260/133; 260/635 H
[51] Int. Cl. ............................................. C07c 29/04
[58] Field of Search ................. 260/633, 634, 635 H

[56] References Cited
UNITED STATES PATENTS 3,048,636 8/1962 Grinstead .................... 260/635 H X
3,360,548 12/1967 Clark et al. .................. 260/635 H X
3,479,262 11/1969 Maclean et al. ............. 260/597 R X

FOREIGN PATENTS OR APPLICATIONS

1,344,652 10/1963 France ................................ 260/634
1,518,962 3/1968 France ............................ 260/635 H Primary Examiner—Howard T. Mars
Attorney, Agent, or Firm—Sherman & Shalloway

[57] ABSTRACT

A process for the production of an alkylene chloro- or bromo-hydrin having 2–4 carbon atoms, which comprises oxidizing an aliphatic olefin having 2–4 carbon atoms by contract with a thallic salt in the presence of water, said process being characterized in that at least one type of ion selected from ions of chlorine and bromine is present in the reaction system in an amount such that the atomic ratio of the chlorine and/or bromine ions to thallium atom is at least 6:1.

8 Claims, 1 Drawing Figure

PROCESS FOR OXIDIZING OLEFINS

This application is a continuation of application Ser. No. 56871, filed July 21, 1970 and now abandoned, which in turn is a continuation-in-part of application Ser. No. 615,432, filed Feb. 13, 1967 and now abandoned.

This invention relates to a process for oxidizing unsubstituted aliphatic olefins having 2 to 4 carbon atoms. More particularly, this invention relates to a process for obtaining the corresponding halohydrins by oxidizing such olefins with a thallic salt [hereinafter regerred to as Tl (III)] in the presence of water and halogen ions.

Heretofore, halohydrins have been obtained from olefins by adding hypohalogenous acid to olefins. This method, however, is not necessarily satisfactory commercially because it necessitates a great quantity of halogens.

According to the process of this invention, however, the corresponding halohydrins can be manufactured easily at high yields by contacting olefins with Tl (III) in the presence of water and halogen ions (in neutrality or acidity) at a temperature from room temperature to 180°C.

In this invention, when in the concurrent presense of a metal salt (hereinafter to be referred to as Redox metal salt) capable of possessing different valences under reaction conditions and oxidizable with molecular oxygen, together with water, a thallium salt and halogen ions (in neutrality or acidity), molecular oxygen is contacted with these, a thallous salt (to be referred to as Tl (I) hereinafter) concurrently or subsequently formed is repeatedly oxidized to Tl (III).

A method of oxidizing olefins by using a thallic salt is reported in U.S. Pat. No. 3,048,636. The method of this U.S. Pat. is a method of obtaining at least one compound selected fron the group consisting of glycols, aldehydes and ketones by oxidizing an olefin with the use of an equimolar amount, based on an olefinic hydrocarbon, of an acid aqueous solution of a thallic salt. As the thallic salt, the use of thallic nitrate and thallic sulphate is recommended. However, according to the method of this U.S. patent, no substantial amount of halohydrins can be obtained.

We have extensively studied the action of a thallic salt on olefins, and found that when bromine ions and/or chlorine ions are present in the reaction system, another reaction, in addition to the reaction disclosed in the said U.S. patent, takes place to form an alkylene halohydrin. By utilizing this reaction, alkylene halohydrins can be prepared at a very high yield, and such a method can be applied to a commercial production.

The reaction mechanism of the method of U.S. Pat. 3,048,636 is reported in Journal of Organic Chemistry, Vol. 26, pages 238–240 by Robert R. Grinstead. According to this report, the glycol, aldehyde and ketone are formed by the following reactions:

$$RCH=CHR' + Tl^{+++} + 2H_2O \rightarrow RCHOHCHOHR' + Tl^+ + 2H^+ \quad (1)$$

$$RCH=CHR' + Tl^{+++} + 2H_2O \rightarrow RCOCH_2R' + Tl^+ + 2H^+ \quad (2)$$

We have studied the case where Br⁻ and/or Cl⁻ are present in the said reaction system, and found that the following reactions take place, e.g., when ethylene is used:

$$CH_2=CH_2 + TlCl_3 + 2H_2O \rightarrow HOCH_2CH_2OH + TlCl + 2HCl \quad (1')$$

$$CH_2=CH_2 + TlCl_3 + H_2O \rightarrow CH_3CHO + TlCl + 2HCl \quad (2')$$

$$CH_2=CH_2 + TlCl_3 + H_2O \rightarrow ClCH_2OH + TlCl + HCl \quad (3')$$

As already mentioned, reactions (1') and (2') take place by the reaction of an olefin with a thallic salt as disclosed in the above U.S. Pat.; but reaction (3') above is not in any way taught by said Patent. However, we have found that reaction (3') also takes place between an olefin and a thallic salt when Cl⁻ and/or Br⁻ are present, and that when the reaction conditions are appropriately adjusted, it is possible to produce the desired alkylene halohydrin as the principal product. Thus, according to this invention, it has been found that by adjusting the reaction conditions an alkylene halohydrin is formed at a high yield by utilizing reaction (3').

According to this invention, it is possible to direct the reaction so as to mainly induce a reaction to produce an alkylene halohydrin according to formula (3') by oxidizing at least one unsubstituted aliphatic olefin having 2–4 carbon atoms selected from the group consisting of ethylene, propylene, butene-1, butene-2 and isobutene by contact with chlorine ions and/or bromine ions at an atomic ratio of a total of these ions to the thallium atom adjusted to at least 4:1. The alkylene halohydrin referred to herein is an alkylene chlorohydrin and/or alkylene bromohydrin having the number of cargon atoms corresponding to the olefin with 2–4 carbon atoms.

Accordingly it is a principal object of the present invention to provide a novel process for the production of an alkylene chlorohydrin and/or alkylene bromohydrin, which process eliminates the inherent difficiencies and disadvantages of previous processes.

It is a further object of the present invention to provide such an improved process whereby the desired chlorohydrin and/or bromohydrin is produced in high yields and in high purity by oxidizing an aliphatic olefin by contact with a thallic salt in the presence of water, the process being characterized by the presence of chlorine and/or bromine ions in the amount such that the atomic ratio of such ions to the thallic ions is at least 4.

It is yet a further object of the present invention to provide such an improved process for the production of a chlorohydrin and/or bromohydrin wherein through the additional presence of a redox salt the thallic salt can be regenerated.

Still further objects and advantages of the novel processes of the present invention will become more apparent from the following more detailed description thereof.

It has been found according to the present invention that the atomic ratio of chlorine ions and/or bromine ions to the thallium atom plays an important role in the selectivity of the reaction when an aliphatic olefin with 2–4 carbon atoms (hereinafter may be referred to simply as olefin) is reacted with an aqueous solution of a thallic salt.

Figure 1:
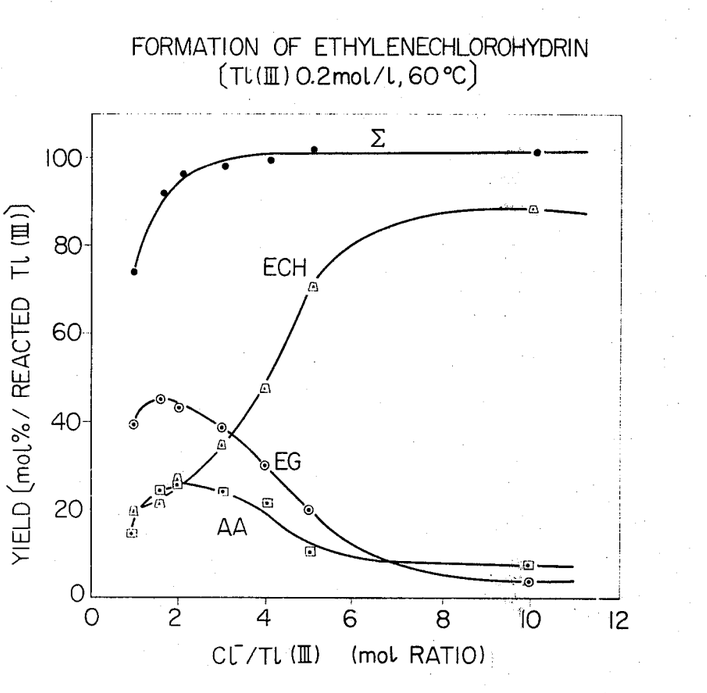

This will be explained with reference to the accompanying graph, which shows the results of the oxidation of ethylene according to the conditions of Controls 1–4 and Examples 1–3 wherein the abscissa represents an atomic ratio of chlorine ions ($Cl^-$) to a thallic atom $]Tl(III)]$ and the ordinate shows a yield of the product based on the reacted thallic salt. The curves ECH, EG and AA respectively show the yield of ethylene chlorohydrin, ethylene glycol and acetaldehyde.

As is clear from this graph, when the atomic ratio of $Cl^-/Tl(III)$ is 3, and particularly 2 or less, ethylene glycol and acetaldehyde are predominantly formed and the yield of ethylene chlorohydrin is low. However, when the atomic ratio of $Cl^-/Tl(III)$ is above 4, especially above 6, the production of ethylene glycol and acetaldehyde is greatly lowered and the formation of ethylene chlorohydrin is markedly increased. If the atomic ratio is above 6, ethylene chlorohydrin is formed at a yield several times as large as the maximum yield (about 45%) of ethylene glycol obtained under the same conditions.

Accordingly, it is necessary in this invention to adjust the atomic ratio of $Cl^-$ and/or $Br^-$ to $Tl(III)$ in the reaction medium to at least 4, preferably at least 6. There is no particular restriction on the upper limit of the $Cl^-$ (and/or $Br^-$)/$Tl(III)$ ratio. But the reaction rate tends to get smaller as the concentration of these halogen ions become greater. Practically, the mole ratio may be 4–100 or greater.

As the halogen to be used, any compound may be used as long as it is in the ionic form under the reaction conditions. Usually the halogen is used in the form of hydrogen halide, thallic halide and/or redox metal halide such as chlorides and bromides of copper and iron. In order to prevent the reaction system from getting excessively acidic, the chloride or bromide of an alkali metal such as sodium, potassium and lithium and an alkaline earth metal such as calcium and magnesium or other metals which do not directly participate in the reaction may also be used. Since the $Cl^-$ or $Br^-$ is consumed in the form of the corresponding hydrogen halide in the reaction, the consumed $Cl^-$ or $Br^-$ should be supplemented in the reaction system as its hydrogen halide.

It is better to avoid the copresence of too great a quantity of fluorine and iodine ions because fluorine tends to cause the formation of carbonyl compounds as by-products and iodine tends to reduce $Tl(III)$. The concentration of chlorine ions and/or bromine ions may advantageously be 0.1 to 10 moles/liter based on the reaction medium, but need not necessarily be confined to this range.

The $Tl(III)$ used in the reaction may be any kind of salt as long as it is soluble in the reaction medium even in a small amount. The essential feature of this invention is that the reaction should always be carried out in the presence of chlorine ions and/or bromine ions. As the reaction itself is promoted by the influence of these ions, it is convenient if the thallic salt to be used is in the form of chloride or bromide.

Practically, $Tl(III)$ is used in the concentration of 0.1 to 50% by weight based on the reaction medium, although it may be of a lower or higher concentration where desired.

If $TlCl_3$ or $TlBr_3$ is used as the thallic salt, it is necessary to add a chlorine and/or bromine ion (other than a thallic salt) donor as mentioned above to the reaction system in addition to a thallic chloride or thallic bromide since the atomic ratio of $Cl^-$ and/or $Br^-$ to $Tl$ must be, as mentioned above, adjusted to at least 4, preferably at least 6. 4, Walter is the most convenient medium to be used in the reaction, and the reaction is ordinarily carried out in an aqueous solution. Besides water, organic compounds miscible with water can be used as the medium. Also, glycol is suitable as the reaction medium, and the reaction proceeds in the presence of glycol without any difficulty. Likewise, the halohydrin formed by the reaction can also be used as the reaction medium together with water. The formed halohydrin, particularly bromohydrin, is preferably taken out of the reaction system as quickly as possible without using it as the reaction medium to avoid hydroylsis.

The use of monohydric alcohols such as methyl alcohol, and acetone and carbonyl compounds is not desirable as they tend to reduce the $Tl(III)$.

In the reaction of this invention, water is also a reactant. Therefore, the presence of water or water vapour is indispensable when any kind of liquid is used as the reaction medium.

The pH of the reaction medium may be neutral or acidic, but it is preferable that the pH should be adjusted to less than 4.

The olefins may be used directly or on dilution with a suitable diluent such as oxygen, air, nitrogen, ethane and propane.

Generally, olefins having more carbon atoms tend more to form carbonyl compounds. Ethylene is the most suitable olefin with propylene and butene being somewhat less preferred. Among the olefins having 4 carbon atoms, 1-olefins yield less carbonyl compounds as by-products.

The olefins having 2–4 carbon atoms used in this invention may be in the gaseous or liquid form. Generally, since the olefins have a small affinity for the reaction liquor (especially in the case of an aqueous solution) and also low solubility in it, the introduction and mixing of the olefins need be carried out with the strongest possible stirring or shaking to quicken the dispersion and diffusion of the olefin into the reaction liquor. When a gaseous olefin is used, the operation can be easily carried out if an excess of olefin is diluted with another gas and circulated forcibly into the reaction liquor.

When the process of this invention is practiced, the olefin used as a starting material may be fed to the reaction system at atmospheric pressure, but preferably the olefin is fed at an elevated pressure. As the reaction rate is proportional to the concentration of the olefin in the reaction system, and the concentration of olefin to its partial pressure, the partial pressure of the olefin should preferably be higher than 5 atmospheres, preferably higher than 20 atmospheres. In actuality, any high pressure industrially utilizable can be used.

In this invention, it is preferable to react the olefin at a pressure above 5 atmospheres, particularly at least 20 atmospheres. For this purpose, it is preferable that excess olefin always be fed into the reaction system during the progress of the oxidation reaction. It is also preferable to feed the olefin continually during the reaction.

The olefin that is used need not be particularly purified and an olefin having a purity of more than 90% obtained by the usual petrochemical industry is sufficient.

If sulphur or sulphur-containing compounds are present in the olefin, they tend to be linked with the thallium to form an insoluble and inert salt. It is desirable therefore to carry out desulfurization as much as possible.

The reaction of this invention may be carried out at room temperature to 180°C., preferably 50°C. 150°C. The alkylene halohydrin thus formed can be separated and recovered from the reaction system by a known operation such as distillation and extraction. Since the alkylene halohydrin forms an azeotropic mixture with water, it is advantageously separated in such a form.

The alkylene halohydrin formed in the reaction system is easily hydrolysed without separation at a temperature above 100°C., preferably from 120° to 250°C. and converted to an alkylene glycol. Therefore, the alkylene halohydrin can be hydrolysed in the same reaction system or in another system to an alkylene glycol. If the process of this invention is carried out at a temperature of 100° to 250°C, preferably 120°–1200°C., the formed alkylene halohydrin is converted continuously into an alkylene glycol in the reaction system, and it is possible to prepare an alkylene glycol by the process of this invention.

Generally, when the process of this invention is performed at a temperature above 100°C., the alkylene halohydrin is mainly formed in a short reaction time. When preparing the alkylene halohydrin under such conditions, therefore, it is necessary to limit the reaction time to continually separate the alkylene halohydrin. Since the presence of a free hydrogen halide avoids the hydrolysis of an alkylene halohydrin, it is preferable to make the concentration of hydrochloric acid or bromohydroacid in the reaction medium higher. Halogen ions themselves, for instance halogen ions present in the reaction medium by chlorides or bromides, are not particularly effective.

According to this invention, it has been found that in the production of the alkylene halohydrin it is sometimes advantageous to add to the reaction system a metal salt oxidizable with molecular oxygen and capable of possessing different valences under the reaction conditions. By introducing the salt with molecular oxygen into the reaction liquor either concurrently or separately, it is possible to convert the thallous salt [Tl (I)] produced by the formation of the alkylene halohydrin to a thiallic salt [Tl (III)] and recycle the thallic salt for use in the reaction of producing the halohydrin.

As the metal salt oxidizable with oxygen and capable of possessing different valences in the above regeneration reaction, we can cite compounds of a redox metal such as copper, mercury, chromium, manganese, iron, cobalt and nickel. Such metal compounds may be in any form as long as they can yield ions of their metal in an acid aqueous medium in which chlorine ions and/or bromine ions are present under the conditions specified in the present invention. Preferable compounds are copper bromide, copper chloride, iron bromide, iron chloride, copper oxide, iron oxide, basic copper carbonate, copper sulphate and iron sulphate. Additionally, all of the inorganic acid or organic acid salts of the above metals can be used. Furthermore, these metal compounds may be added either in the state of low valence or in the state of high valence.

These metal compounds may be used in the form of various salts soluble or insoluble in the medium to be used, but because the reaction is carried out in the co-presence of halogen ions, it is advantageous to use them in the form of halides, especially chlorides or bromides. They are also used in the form of hydroxides or carbonates for the purpose of adjusting the amount of halogen ions used.

The redox metal salts are used ordinally in the amount 1 to 100 times that of the thallic salt in terms of mole ratio, but if necessary, they may be used in a greater amount.

The regeneration reaction of the thallous salt easily proceeds by mixing and reacting Tl (I) formed by the oxidation of an olefin with the redox-metal salt, halogen ions and molecular oxygen in a neutral or acidic water medium to again produce Tl (III). The reaction according to the following formulas (4) and (5), in which copper is used as the redox metal and chlorine as the halogen.

$$TlCl + 2CuCl_2 \rightarrow TlCl_3 + 2CuCl \quad (4)$$

$$2CuCl + 2HCl + \tfrac{1}{2}O_2 \rightarrow 2CuCl_2 + H_2O \quad (5)$$

Both of the reactions (4) and (5) usually proceed concurrently, and Tl (I) is oxidized with the redox metal salt (shown as copper chloride in the formulas) to Tl (III) [refer to formula (4)]. At the same time, the redox metal reduced to a state of low valence is immediately oxidized with molecular oxygen to a high valence state [refer to formula (5)].

If an iron salt is used as the redox metal salt, only the following reaction corresponding to the formula (4) takes place in the presence of an olefin.

$$TlX + 2FeX_3 + X^- \rightarrow TlX^-_4 + 2FeX_2 \quad (4')$$

It may be possible to carry out the above reaction separately from the folowing reaction corresponding to the formula (5)

$$2FeX_2 + 2HX + \tfrac{1}{2}O_2 \rightarrow FeX_3 + H_2O \quad (5')$$

The regeneration reaction of thallium proceeds more quickly as the acid concentration is higher, the concentration of halogen ions is higher, the amount metal ions are of redox metal than that of thallium ions, and the reaction temperature is higher.

As the source of molecular oxygen, air can be used, but when oxygen is used, the progress of the reaction becomes more rapid. When they are used under the elevated pressure, it is easier to carry out the reaction. Especially, when the reaction is carried out at higher temperature and elevated pressure, it proceeds sufficiently rapidly in the neutral reaction system without the need for acidifying it.

Thus, the regeneration reaction of thallium proceeds more rapidly as the reactions are more severe. Even under mild conditions, however, such as at room temperature, atmospheric pressure and in neutrality, the reaction proceeds and the object of regeneration cen be attained. It is therefore possible to bring the conditions of the regeneration conditions into conformity to those of the oxyhalogenation reaction of olefins as above mentioned.

Thus, according to the present invention, it is possible to carry out the oxidation of an olefin by which the olefin is oxidized with Tl(III) to the alkylene halohydrin, concurrently with, or separately from, the regeneration reaction of thallium salt by which the thus formed Tl(I) is converted into Tl(III) in the presene of a redox metal compound such as Cu(II) and molecular oxygen. As a result of these reactions, the thallic salt

[Tl(III)] and the redox metal such as Cu(II) can be regarded as merely exhibiting a catalytic action, and the alkylene halohydrin can be continuously produced according to the following formula.

$$CH_2=CH_2 + HCl + \tfrac{1}{2}O_2 \rightarrow HOCH_2 \cdot CH_2 \cdot Cl \quad (6)$$

As the present invention does not particularly necessitate the isolation and purification of the thallium salt and redox metal compounds either in the oxidation reaction of olefin or in the regeneration reaction of the thallous salt, an alkylene halohydrin can be continuously produced from an olefin by very simple operations according to the method of this invention. With respect to the type, concentration, amount and pH of each component in the regeneration reaction of the thallous salt, however, it is preferable that care should be taken to use the same type, high concentration, great quantity and strong acidity as much as possible within the ranges which do not depart from the conditions suitable for oxidation of the olefin while adjusting the partial pressure of oxygen to a high level.

According to the present invention, many cationic and anionic ions are not detrimental to the reaction of this invention. For instance, such cations as Li, Na, K, Ca, Be, Mg, Sr, Al, Y, La, Ce, Nd, Yb, Ti, Zr, V, U, An, Cd, Ga, In, and Ag are not detrimental and almost inert thoughout both the oxidation of olefin and the regeneration reaction of thallium.

The addition of such cations as Pt, Pd, Th and Bi is not detrimental to the regeneration reaction of thallium, but is sometimes not preferred in the oxyhalogenation of olefin since they promote the formation of carbonyl compounds or oxidize the formed olefin oxide to a higher degree.

It has been stated that any anion of the redox metal salt and thallic salt can be used according to this invention, but some of the anions that constitute these metal salts give the following influences and care should, therefore, be taken in this respect.

For instance, such anions as $SO_4$, $ClO_4$, $BF_4$, $PO_4$ and toluenesulfonic acid ions are not harmful to the regeneration reaction of thallium, but these anions tend to form carbonyl compounds or to induce other side-reactions. It is better therefore to avoid the use of too great an amount thereof.

$NO_3$ anions promote the regeneration reaction of thallium, and by the addition of such anions the progress of the reaction becomes remarkably fast. But in the oxidation of olefins, it is dangerous to use $NO_3$ ions in a great quantity as they tend to facilitate further oxidation.

Sulphur and sulphur compounds are not preferable in both of these reactions. The thallic compounds, redox metal salts and halogens used in the reaction may be of a purity such that can be obtained by the ordinary mining and industrial processes, at which purity the reaction sufficiently proceeds. It is not particularly necessary to purify them.

In the following, various embodiments applicable to the practice of both the oxidation reaction of olefins and the regeneration of thallous salts according to this invention will be explained. Such embodiments are basically as follows:

1. A method by which the whole reaction is carried out in one stage by the use of an olefin and molecular oxygen.

2. A method by which both of the reactions are carried out in two stages by using an olefin and molecular oxygen separately.

3. A method by which each of the steps of methods (1) and (2) is further divided, if necessary, into many stages.

These embodiments will be explained in detail below.

1. The method by which the whole reaction is carried out in one stage by the use of an olefin and a molecular oxygen can be practiced in the following manner.

A reaction vessel is charged concurrently with:
a. water or an aqueous medium,
b. thallic salt [Tl(III)] or thallous salt [Tl(I)],
c. $Cl^-$ and/or $Br^-$ in an amount sufficient to satisfy the specific ratio of $Cl^-$ and/or $Br^-$ to Tl mentioned above, and,
d. A compound of the redox metal (the valence of the metal may be high or low), and then an olefin and molecular oxygen are fed into the vessel at the same time.

By these procedures, it is possible to carry out (A) the oxidation reaction of the olefin and (B) the regeneration reaction of a thallous salt to convert it to a thallic salt, concurrently in one vessel.

The reason why in this embodiment a thallous salt or a salt of a high valence or low valence redox metal can be charged into the vessel is that the feeding of molecular oxygen into the reaction vessel leads to the conversion of the thallous salt into a thallic salt to carry out the oxidation reaction, and in the meantime, the salt of a low valence redox metal is also converted into that of a high valence redox metal as mentioned above.

When this method is practiced, an olefin and molecular oxygen concurrently exist in the reaction system so there may be a danger of explosion. Also disadvantageously, pure oxygen should be used because the use of inexpensive air causes the accumulation of nitrogen in the circulating gas leading to a decrease in the reaction ratio per volume of the apparatus used.

2. The method by which both of the reactions are carried out in two stages by using an olefin and molecular oxygen separately can be effected in the following manner.

In this case, the olefin-fed zone is separated from a zone into which molecular oxygen is fed. In the olefin-feeding zone, the oxidation reaction is carried out in the presence of a thallic salt in accordance with the conditions of the present invention, whereby an alkylene halohydrin is produced as mentioned above. Into the second zone, oxygen is fed and the regeneration of the thallous salt is effected.

This method may be carried out by the use of one reactor having two reaction zones, one reactor for each of these zones or one reactor where these reactions are to be alternately carried out. In the following, we shall direct our explanation to the case where the method is carried out by using one reactor for each of the reactions, i.e., a first and second reactor.

The redox metal compound may be put into the second reactor or into the first reactor in advance. In general, the redox metal compound does not impede the oxidation reaction in the first reactor. When a high valence ion (for instance, trivalent iron) compound is used as the redox metal compound in the first reactor, the thallous salt formed there is converted into a thallic salt in an amount corresponding to the said iron compound without supplying molecular oxygen into the first reactor.

The afore-mentioned method can be practiced either batchwise or continuously. As an olefin and oxygen are each fed into different reactors according to this method, there is utterly no danger of explosion and air can be advantageously used as the oxygen source. But the operation of the reaction becomes complicated as compared with the one-stage method because of dividing one reactor into two. The control of the reactions also becomes complicated.

3. In methods (1) and (2), it is not necessary to carry out each of the reactions in one stage, and various modifications can be used.

For example, the oxidation reaction and the regeneration reaction can be carried out in one or more reactors concurrently or separately by dividing a reaction zone for each reaction into a low temperature reaction zone and a high temperature reaction zone or into more than two zones. In this case, the reaction zones for both the oxidation and regeneration reactions may be optionally combined with each other. By optionally combining such procedures, the reactions can be easily controlled, explosion can be prevented, and a continuous operation can be smoothly carried out.

Procedures of separating the reaction products obtained according to the method of this invention will now be detailed.

The reaction products can be recovered by withdrawing part or whole of the reaction liquor after the completion of each reaction or after passing through a reaction zone or at an optional stage during the reaction.

1. Separation of alkylene Haloydrin

An alkylene halohydrin tends to undergo hydrolysis in an aqueous system and to be converted into an alkylene glycol. In order to recover an alkylene halohydrin, therefore, it is preferable to carry out the oxidation reaction under the conditions such as not to subject it to hydrolysis as much as possible, and to separate the reaction product by such means as extraction, distillation, azeotropic distillation and flash evaporation under the conditions such as not to induce hydrolysis of the product. Most preferably, the moment an alkylene halohydrin is formed by the oxidation reaction, it is separated by the above means or by making it accompany the olefin to be fed and recycled or such olefin and oxygen. The so separated alkylene halohydrin can be purified by methods known per se.

The formation of a small amount of aldhydes or ketones is inevitable even by the method of this invention. Since these compounds are by themselves useful and they cause the consumption of a thallic compound or induce the formation of high molecular weitht impurities, it is preferable to separate them immediately.

As these compounds are relatively low boiling substances, they can be separated and recovered by the same procedures as used in the separation of halohydrin singly or before or after the separation of halohydrin when the separation of halohydrin is effected.

The apparatus to be used in this invention is not particularly restricted, but consideration as to the corrosion is necessary with respect to the portion which contacts halogen, particularly oxygen and halogen in acidic condition. Usually, preferable apparatus are those lined with titanium, titanium alloy, tantalum, glass, enamel, and thermoplastic or thermosetting resins such as fluorine resins.

The thallium or redox metal salts used in this invention may be used in the form of suspension. Tl(I) produced by the oxidation of an olefin is liable to be precipitated in liquor in the presence of halogen ions in the form of thallic halide (or complex salts of thallous halide and thallic halide $TlCl_3 \cdot 3TlCl$) which has low solubility in water or many of the used aqueous media, and the redox metal salts also take the form of cuprous chloride or iron hydroxide which is insoluble in the aqueous media. Appropriate care should therefore be taken with respect to the reaction and transportation of such a suspension. Consideration is also necessary to ensure a sufficient dispersion of the olefin and oxygen in the liquor. A small amount of a surface active agent may be added in order to make the contact of gas-liquid, solid-liquid and gas-liquid-solid sufficient.

The alkylene halohydrin produced and separated by the method of this invention may be offered for any use of its own, but if desired, it can be hydrolysed to obtain an alkylene glycol according to the known method. It is also possible to convert the alkylene halohydrin to alkylene oxide, and then to hydrolyse it to an alkylene glycol.

The regeneration of the thallous salt formed when an alkylene halohydrin is prepared by oxidizing the olefin according to the method of this invention need not always be carried out in the form such that is is contained in the reaction liquor just after the oxidation reaction. According to another procedure, a thallium salt predominantly comprising a thallous salt is separated from the reaction liquor by known separating means such as filtration and centrifugal separation, and then regenerated to a thallic salt by contact with a molecular oxygen in the presence of a compound of a redox metal in an acidic or neutral aqueous medium. The thallic salt so regenerated can of course be used in the oxidation reaction of this invention. When the redox metal compound is optionally separated from the thallic salt in regeneration, a method can be employed by which the redox metal compound is first precipitated abd separated by concentrating it or a method by which it is separated by the use of an ion-exchange resin. Preferably, separation should be effected by solvent-extraction using oxygen-containing organic solvents such as ethers, esters and ketones, particularly ethyl ether, isopropyl ether, methyl isobutyl ketone and diisobutyl ketone.

In the above-mentioned extraction, the thallic compound is extracted with such solvents from an aqueous solution of hydrohalogenic acid in the form of halogenothallic acid ($HTlX_4$, X being halogen). On the other hand, hydrohalogenic acid, copper chloride and thallous compound are not at all extracted. When an iron salt is used in the regeneration step, it is preferable to adjust the acid concentration of the aqueous solution to about 2 N, and to carry out the extraction with the use of an ether type solvent. Also, it is preferable to employ lower extraction temperatures. The thallic compound extracted may be recovered by evaporating the organic solvent under reduced pressure or may be recovered by re-extraction with a warm water utilizing the difference of distribution coefficient.

This invention will be explained hereinafter by Examples and Controls in which the parts are by weight and the identification and quantitative determination of the product were performed by the following methods.

| Tl(III): | Oxidation-reduction titration (Iodometry) Weight analysis (neutralization method) |
|---|---|
| Ethylene glycol: | Gaschromatography Oxidation-reduction titration (per-iodic acid oxidation method) |
| Acetaldehyde: | Polarography Weight-analysis (2,4-dinitrophenylhydrazine method; all carbonyl compounds are calculated as acetaldehyde) |
| Ethylene halohydrin: | Gaschromatography Volume analysis (halogen titration method) |
| Others: | Gaschromatography Infrared spectrophotometry others |

EXAMPLES 1–4 and Controls 1–4

Thallic hydroxide [Tl(OH)$_3$] was dissolved (partly suspended) in a dilute aqueous hydrochloric acid to adjust the concentration of [Tl(III)] to 0.20 mole/l. While the solution was being stirred in a pressurized reactor, ethylene was introduced (at a reaction pressure of 75 to 80 kg/cm$^2$ guage) at 60°C. for 5 hours. The reaction was carried out with the Cl$^-$/Tl(III) atomic ratio varied, and the results are shown in Table 1.

TABLE 1

| | Cl$^-$/Tl(III) atomic ratio (concentration at the initiation of reaction) | Yield of Product [mol % based on the consumed Tl(III)] | | |
|---|---|---|---|---|
| | | EG | AA | ECH |
| Control 1 | 1.0 | 39 | 15 | 20 |
| 2 | 1.6 | 45 | 25 | 22 |
| 3 | 2.0 | 44 | 26 | 27 |
| 4 | 3.0 | 39 | 24 | 35 |
| Example 1 | 4.0 | 30 | 22 | 48 |
| 2 | 5.0 | 20 | 11 | 71 |
| 3 | 10.0 | 5 | 8 | 89 |
| 4 | 5.6 [Tl(III) 0.5 mol/l.] | 7 | 2 | 93 |

It is clear from Table 1 that the reactions of formulas (1) and (2) to oxidize an olefin with Tl(III) which have been known gradually come to a stop with the increase of the Cl$^-$ concentration and the reaction of this invention becomes dominant.

EXAMPLES 5–9

Thallic hydroxide (28.3 parts), 600 parts of 0.6 N aqueous hydrochloric acid and sodium chloride in the amounts indicated in the following Table 2 were put into a pressurised reactor, and the vessel was immersed into a heated bath. While maintaining the temperature indicated in Table 2 and stirring the vessel, ethylene was introduced to a pressure of 60 atmospheres. At the end of the indicated period, the reaction was ceased and ethylene chlorohydrin was obtained at the yields shown in Table 2.

Table 2

| | | Reaction Condition and Yield of ECH | | | |
|---|---|---|---|---|---|
| Examples | Amount added of sodium chloride (parts) | Reaction Temperature (°C.) | Reaction Time (hour) | Ratio of thallium reacted (%) | Yield of ethylene chlorohydrin (mole % based reacted thallium) |
| 5 | 28.1 | 90 | 4 | 97.1 | 77.7 |
| 6 | 32.1 | 90 | 5 | 97.6 | 82.3 |
| 7 | 56.1 | 90 | 6 | 97.6 | 88.0 |
| 8 | 21.0 | 100 | 110(min) | 91.8 | 77.2 |
| 9 | 21.0 | 120 | 40(min) | 95.5 | 67.8 |

EXAMPLES 10–15

Thallic chloride (175 parts), the additive indicated in Table 3 and water to adjust the total amount of the reaction mixture to 600 parts were put into a pressurised reactor. It was immersed in a heated bath. While stirring the vessel, ethylene was introduced to a pressure of 60 atmospheres and reaction was carried out for 6 hours. After the end of reaction, the products were analyzed and ethylene chlorohydrin was obtained as shown in Table 3.

Table 3

| Examples | Additive Compound | Amount (part) | Ratio of Thallium reacted (%) | Yield of Ethylene chlorohydrin (mole % based on the reacted thallium) |
|---|---|---|---|---|
| 10 | 7N HCl | 60 | 96.1 | 84.6 |
| 11 | 6N HCl NaCl | 4.5 8.8 | 96.7 | 85.9 |
| 12 | NaCl | 24.5 | 98.4 | 82.3 |
| 13 | KCl | 31.6 | 96.9 | 91.0 |
| 14 | ZnCl$_2$ | 29.3 | 99.9 | 79.4 |
| 15 | CaCl$_2$.2H$_2$O | 30.6 | 97.2 | 82.2 |

EXAMPLES 16-18

Thallic hydroxide and an additive were put in a pressurised reactor in the amounts indicated in Table 4 and further water was added to adjust the total amount of the reaction mixture to 100 parts. An olefin was introduced to the mixture. The reaction vessel was immersed in a heated bath and the reaction was carried out at the temperatures indicated in Table 4. The analysis of the products gave the results shown in Table 4.

Table 4

| Examples | Reaction Conditions and Yield of Products | | |
|---|---|---|---|
| | 16 | 17 | 18 |
| Thallic hydroxide (part) | 7.08 | 4.72 | 4.72 |
| Additive (part) | 3N HCl 30 Na Cl 3.51 | 6N HCl 10 NaCl 8.18 | 3N HBr 20 NaBr 2.06 |
| Olefine used | Propylene | Propylene | Ethylene |
| Pressure during reaction (atm.) | 17.5 | 75 | 60 |
| Reaction temperature (°C.) | 90 | 90 | 80 |
| Reaction time | 6 | 8 | 4 |
| Ratio of Tl(III) reacted (%) | 98.0 | 100 | 53.6 |
| Yield of halohydrin (mole % based on the reacted thallium) | Peopylene Chlorohydrin 58.6 | Propylene Chlorohydrin 59.3 | Ethylene Bromohydrin 75.8 |
| Yield of glycol (mole % based on the reacted thallium) | Propylene glycol 8.1 | Propylene glycol 6.5 | Ethylene glycol 11.9 |
| Yield of Carbonyl compound (mole % based on the reacted thallium) | Acetone 37.2 | Acetone 38.4 | Acetaldehyde 1.2 |

EXAMPLE 19

Thallous chloride (12.0 parts), 81.0 parts of ferric chloride, and 50 parts of 1N aqueous hydrochloric acid were dissolved into water and to make 300 parts of a solution (a part of TlCl being suspended). While the solution was heated to 160°C a gaseous mixture of ethylene and oxygen (96% by volume of ethylene and 4% by volume of oxygen) was introduced at a pressure of 18–22 kg/cm² gauge. Thus, reaction was carried out for 3 hours.

The outlet for the flowing gas was heated, and the formed acetaldehyde and ethylene chlorohydrin were, together with some water, taken out of the reaction system immediately by distillation. There were obtained 15 0 parts of ethylene chlorohydrin and 1.5 parts of acetaldehyde.

EXAMPLE 20

Thallic chloride (18.6 parts), 45 parts of 6 N aqueous hydrochloric acid, 8.8 parts of sodium chloride and water were charged into a pressurized reactor to adjust the total amount to 600 parts. The solution was heated to 80°C, and while stirring it, ethylene was introduced to a pressure of 60 atmospheres. The reaction was carried out for 6 hours.

The reaction liquor was distilled and 41.5 parts of an aqueous solution of ethylene chlorohydrin of 1.22 mole/l, was obtained. This corresponds to 86 mole % of the reacted thallium (III).

When this ethylene chlorohydrin was reacted for 2 and half hours at 150°C., 90% of the ethylene chlorohydrin was hydrolysed and 91% of it was converted to ethylene glycol.

EXAMPLE 21

Sixty-two parts of thallic chloride and 81.8 parts of sodium chloride were dissolved into 1000 parts of water, and the solution was reacted with propylene of 75 atmospheres in the same manner as in Example 20 at 90°C.

In 8 hours, the thallic salt was completely conveted into a thallous salt. The reaction liquor was distilled to give 87.9 parts of propylene chlorohydrin of 1.35 mole/l., which corresponds to 59.3 % of the used thallium.

When the propylene chlorohydrin was heated to 150°C., 93% thereof was hydrolysed, and 52 mole % of propylene glycol was obtained.

Fifty-one parts of thallic hydroxide, 20.6 parts of sodium bromide and 100 parts of 6N hydrobromic acid were dissolved in 900 parts of water, and the solution was reacted with ethylene under 60 atmospheres pressure at 80°C. in the same manner as in Example 20.

Four hours later, 53.6% of the thallic salt was reduced to a thallous salt. The distillation of this reaction liquor under reduced pressure gave 56 parts of an aqueous solution of ethylene bromohydrin of 1.45 mole/l., which corresponds to 75.8 mole % of the reacted thallium. When this aqueous solution was heated for 2 hours at 120°C., 92% of the ethylene bromohydrin was hydrolysed and 93% of ethylene glycol was obtained.

EXAMPLE 23

One hundred and five parts of thallic hydroxide and 260 parts of cupric chloride ($CuCl_2 \cdot 2H_2O$) were dissolved in 1000 parts of 3.0 N aqueous hydrochloric acid, and the solution was heated to 110°C. in a gas-circulating type pressurized reactor. While a gaseous mixture of ethylene and oxygen (92% by volume of ethylene and 8% by volume of oxygen) was introduced at 80 kg/cm² gauge, reaction was carried out.

After the lapse of two hours from the start of reaction, 5 parts of the reactin liquor was withdrawn every minute, and by utilizing an azeotrope of it with water, was distilled to thereby form an aqueous solution of ethylene chlorohydrin.

EXAMPLE 24

Three hundred and seventy-two parts (372) of thallic chloride, 1020 parts of cupric chloride and 600 parts of 4N hydrochloric acid were dissolved in 5400 parts of water, and the solution was heated at 110°C in a pressurized oxidation apparatus and contacted with ethylene at 60 atmospheres pressure.

By utilizing an azeotrope with water, the reaction liquor was distilled 110 minutes later. The aqueous solution obtained of ethylene chlorohydrin was sent to a hydrolysis apparatus. The precipitated substance formed in the distillation residue and oxidation reaction apparatus was all transferred to a catalyst regenerating apparatus.

In the hydrolysis apparatus, the aqueous solution of ethylene chlorohydrin was directly, or after dilution with water, heated to 150°C. for 2 and half hours. Subsequent distillation under reduced pressure gave ethylene glycol.

The unreacted aqueous solution of ethylene chlorohydrin (initial fraction) obtained simultaneously was returned to the hydrolysis apparatus, and together with an ethylene chlorohydrin of the next cycle, was hydrolyzed.

The distilled aqueous hydrochloric acid (initial fraction subsequent to EHC) was transferred to the catalyst regenerating apparatus, and together with the precipitate formed during the oxidation reaction and the distillation residue of the formed chlorohydrin, was contacted with $O_2$ of 30 atmospheres.

Three hours later, the reaction liquor was again sent to the oxidation reaction apparatus. With the addition of water, the total amount was adjusted to 6000 parts, and the above-mentioned steps were repeated.

As a result of repeating the said cycle 5 times, the total amount of the obtained ethylene glycol was 180 to 240 parts, and was greater as the concentration of the aqueous solution to be hydrolysed was larger.

EXAMPLE 25

A pressurized reactor provided with a stirrer was charged with 100 parts of 0.4 N aqueous hydrochloric acid and 2.5 parts of thallic hydroxide, and while the mixture was stirred, ethylene was introduced to a pressure of 60 atmospheres. The reaction was carried out for 5 hours at 70°C.

The analysis of the reaction mixture indicated that the thallic salt disappeared and 31.4% of ethylene glycol, 48.3% of ethylene chlorohydrin and 22.6% acetaldehyde, based on the added thallium, were obtained.

The precipitate formed was filtered to give 24 parts of thallous chloride. To the thallous chloride were added 70 parts of 4 N aqueous hydrochloric acid and 8 parts of cupric chloride ($CuCl_2 \cdot 2H_2O$). The mixture was heated for 5 hours at 70°C. while stirring, and oxygen was introduced. After cooling, the mixture was extracted with 70 parts of diisobutyl ketone at 20°C., whereby almost all thallic ions in the aqueous layer were extracted but the cupric ions remained completely unextracted. This diisobutyl ketone solution was extracted twice with 70 parts of water at 40°C. to thereby form a hydrochloric acid solution of thallic chloride, of which the thallium content corresponds to 96% of the thallium initially added. When ethylene was again oxidized with the use of this thallic chloride, the results were the same as those obtained by the above procedures.

COMPARATIVE EXAMPLE 1

This example reproduces Example 3 of U.S. Pat. No. 3,048,636 in accordance with the conditions disclosed in Example 1.

200 ml. of a 0.41 mol/liter solution of thallic chloride in 0.10 mol/liter of aqueous hydrochloric acid were placed in a glass reaction vessel provided with a stirrer and gas inlet and outlet tubes. The pH of the solution was adjusted to 2.1 by addition of sodium hydroxide. The solution was maintained at 20°C., and ethylene gas was circulated therein to react it. The ethylene gas circulated in a closed circuit provided with a gas burette. An amount of the gas absorbed during the reaction was measured, and the pressure within the circuit was always maintained at on atmosphere.

During the reaction, a part of the solution was taken out from time to time, and the produced ethylene glycol (EG), ethylene chlorohydrin (ECH), acetaldehyde(AA) and the consumed Tl were quantitatively analyzed in accordance with the following methods.

| | |
|---|---|
| $Tl^{III}$: | Iodometry (KI-method) |
| EG: | Iodometry (periodate method) |
| AA: | Polarography |
| ECH: | Gas-chromatography |

Absorption of ethylene was so slow that even after a laspe of 48 hours, only less than 20% of ethylene was reacted based on $Tl^{III}$. The analysis of the products after a lapse of 8-hour reaction showed the following results.

| | |
|---|---|
| Amount of ethylene absorbed: | 0.033 mol/liter (8% based on initial $Tl^{III}$) |
| Amount of $Tl^{III}$ reacted: | 0.029 mol/liter (7% based on initial $Tl^{III}$) |
| EG: | 0.006 mol/liter (about 20% yield based on the reacted $Tl^{III}$) |
| AA: | 0.003 mol/liter (about 10% yield based on the $Tl^{III}$ reacted) |
| ECH: | 0 |

COMPARATIVE EXAMPLE 2

This example reproduces French Pat. No. 1,344,652.

A titanium-lined autoclave equipped with a stirrer, a gas inlet and a gas outlet with a reflux condenser was charged with an aqueous solution of the composition shown in Table A below. While flowing a great quantity of a mixed gas of ethylene and oxygen thereinto at a predetermined rate, the reaction was effected for 1 hour at a total pressure of 25 kg/cm².

After the end of the reaction, the reaction liquid in the autoclave was analyzed, and ECH and EG contained therein were quantitatively analyzed. The gas passing through the reflux condenser during the reaction was cooled with dry ice, and AA contained in the resulting condensed product was quantitatively analyzed. The methods of quantitative analysis of ECH, EG and AA were the same as mentioned in Comparative Example 1.

The reflux condenser attached to the autoclave served to return back ECH to the autoclave and pass only AA gas through it.

The mixed gas used in the reaction consisted of 33% of ethylene and 67% of oxygen in Experiment conducted at 10°C. In other Experiments conducted at temperatures higher than 100°C., it consisted of 92% of ethylene and 8% of oxygen in order to avoid danger of explosion.

The composition of the aqueous solution initially charged in the present Experiment was as follows:

| | |
|---|---|
| $PdCl_2$ | 0.012 mol/liter |
| $CuCl_2$ | 0.65 mol/liter |
| KCL | 2.10 mol/liter |
| $Cl^-$ concentration | 3.4 mol/liter |

The reaction temperatures and the obtained results are shown in Table 5 below.

Table 5

| Comparative Example No. | Reaction Temperatures and Results | | | |
|---|---|---|---|---|
| | Temperature (°C.) | ECH* (mol/liter) | AA* (mol/liter) | EG* (mol/liter) |
| 2-1 | 10 | 0.014 | 0.095 | 0 |
| 2-2 | 100 | 0.028 | 2.077 | trace |
| 2-3 | 150 – 158 (exothermic) | 0.103 | 0.243 | 0.053 |

(*Mol/liter = mol of the product per liter of the reaction solution)

In comparative Example 2-3, the formation of a tar-like substance and a highly polymerized substance which was presumed to be a condensed product of AA was observed, but their identification and quantitative analysis were not performed.

EXAMPLE 26

In this experiment, the same apparatus and conditions as used in Comparative Example 2 were used except that as catalyst, thallic chloride was used instead of palladium chloride in Comparative Example 2. The composition of the initially charged aqueous solution and the results obtained are shown below.

Composition of the charged aqueous solution

| | |
|---|---|
| $TlCl_3$ | 0.30 mol/liter |
| $CuCl_2$ | 0.65 mol/liter |
| KCl | 1.20 mol/liter |
| Concentration of $Cl^-$ | 3.4 mol/liter |

Table 6

| Experiment No. | Reaction Temperatures and Results | | | |
|---|---|---|---|---|
| | Temperatures (°C.) | ECH* (mol/liter) | AA* (mol/liter) | EG* (mol/liter) |
| 3-1 | 10 | 0.072 | 0.002 | 0 |
| 3-2 | 100 | 0.275 | 0.275 | 0.002 |
| 3-3 | 160 | 0.272 | 0.046 | 0.768 |

(*Mol/liter = same as defined under Table A above).

COMPARATIVE EXAMPLE 3

An experiment was conducted under the same conditions as in Experiment 26 above except that a small amount of palladium chloride was added to the reaction system:

Using the same apparatus and conditions as used in Experiment 26, a small amount of palladium chloride was added to the feed aqueous solution. The composition of the initially charged aqueous solution and results obtained are shown below.

Composition of the charged aqueous solution

| | |
|---|---|
| $PdCl_2$ | 0.012 mol/liter |
| $TlCl_3$ | 0.30 mol/liter |
| $CuCl_2$ | 0.65 mol/liter |
| KCl | 1.20 mol/liter |
| Concentration of $Cl^-$ | 3.4 mol/liter |

Table 7

| Experiment No. | Reaction Temperatures and Results | | | |
|---|---|---|---|---|
| | Temperatures (°C.) | ECH* (mol/liter) | AA* (mol/liter) | EG* (mol/liter) |
| 26 | 10 | 0.009 | 0.200 | 0 |
| 26 | 100 | 0.045 | 2.108 | — |
| 26 | 150–160 (exothermic) | 0.111 | 0.386 | 0.053 |

(*Mol/liter = same as defined under Table A above.)

In Experiment 26-3, the formation of a tar-like substance and a highly polymerized substance which was presumed to be a condensed product of AA was observed, but their identification and quantitative analysis were not performed.

What is claimed is:

1. A process for the preparation of an alkylene chloro-hydrin, bromo-hydrin or mixture thereof, having 2 to 4 carbon atoms, which comprises contacting an unsubstituted mono-olefin having 2 to 4 carbon atoms with an aqueous solution containing chlorine ions, bromine ions or a mixture thereof, and thallic ions (Tl III) said chlorine ion and bromine ion being derived from at least one compound selected from hydrogen chloride, hydrogen bromide, thallium chloride, thallium bromide, chlorides and bromides of redox metals, chlorides and bromides of alkali metals or chlorides and bromides of alkaline earth metals, and said thallic ions (Tl III) being derived from a thallium salt which is soluble in the reaction system at a temperature of from room temperature to 180°C. and at a partial pressure of the olefin above 5 atmospheres, the atomic ratio of said chlorine ions, bromine ions or mixture theeof, to thallic ions being at least 6:1, and recovering by extraction, distillation, azeotropic distillation or flash evaporation, the resulting alkylene chloro-hydrin, bromo-hydrin or mixture thereof.

2. The process of claim 1 wherein molecular oxygen and cupic ions (Cu II) or ferric ions (Fe III) are present in said aqueous solution to convert thallous ions (Tl I) formed by the reaction into thallic ions (Tl III).

3. The process of claim 2 wherein the conversion of thallous ions (Tl I) into thallic ions (Tl III) is carried out in the presence of said olefin.

4. The process of claim 2 wherein the conversion of thallous ions (Tl I) into thallic ions (Tl III) is carried out in the absence of said olefin.

5. The presence of claim 1 wherein said oxidation is carried out at a temperature of from 50° to 150°C.

6. The process of claim 1 wherein said olefin is selected from the group consisting of ethylene and propylene.

7. The process of claim 1 wherein said thallic ions (Tl III) are derived from a thallic salt selected from thallic chloride, thallic bromide and thallic hydroxide.

8. The process of claim 1 wherein the concentration of the thallic ions is 0.1 to 50% by weight based on the weight of the aqueous solution.

* * * * *